United States Patent
Costa et al.

(10) Patent No.: US 7,054,369 B2
(45) Date of Patent: **\*May 30, 2006**

(54) METHOD AND SYSTEM TO IMPROVE THE TRANSPORT OF COMPRESSED VIDEO DATA

(75) Inventors: Pierre Costa, Austin, TX (US); Ahmad Ansari, Austin, TX (US); John Robert Erickson, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/893,196

(22) Filed: Jul. 16, 2004

(65) Prior Publication Data
US 2004/0252770 A1     Dec. 16, 2004

Related U.S. Application Data

(62) Division of application No. 09/942,260, filed on Aug. 28, 2001, now Pat. No. 6,970,512.

(51) Int. Cl.
*H04B 1/66*     (2006.01)

(52) U.S. Cl. ............................. 375/240.24; 375/240.25; 375/240.26; 375/240.23; 375/240.28; 382/233; 382/235; 382/246

(58) Field of Classification Search ........... 375/240.24, 375/240.23, 240.28, 240.29, 240.26, 240.25; 382/235, 246, 233
See application file for complete search history.

(56) References Cited

U.S. PATENT DOCUMENTS

| 5,159,447 A | * | 10/1992 | Haskell et al. ......... 375/240.05 |
|---|---|---|---|
| 5,172,413 A | | 12/1992 | Bradley et al. |
| 5,371,532 A | | 12/1994 | Gelman et al. |
| 5,534,937 A | | 7/1996 | Zhu et al. |
| 5,621,464 A | | 4/1997 | Teo et al. |
| 5,877,812 A | | 3/1999 | Krause et al. |
| 5,898,456 A | | 4/1999 | Wahl |
| 5,956,088 A | | 9/1999 | Shen et al. |
| 5,966,162 A | | 10/1999 | Goode et al. |

(Continued)

OTHER PUBLICATIONS

"International Search Report" for PCT/US03/40186.

*Primary Examiner*—Shawn S. An
(74) *Attorney, Agent, or Firm*—Brinks Hofer Gilson & Lione

(57) ABSTRACT

A method comprises determining a plurality of time intervals Tp and Tn within a variable bit rate (VBR) representation of an image sequence. The time intervals Tp are those in which a number of blocks of information per unit time is greater than a baseline value. The time intervals Tn are those in which a number of blocks of information per unit time is less than the baseline value. A second representation of the image sequence is created in which some blocks of information Bp are removed from the time intervals Tp and interlaced with blocks of information Bn in the time intervals Tn to reduce a variation in a number of blocks of information per unit time between the time intervals Tp and Tn.

6 Claims, 4 Drawing Sheets

U.S. PATENT DOCUMENTS

| | | |
|---|---|---|
| 5,987,621 A | 11/1999 | Duso et al. |
| 5,991,306 A | 11/1999 | Burns et al. |
| 6,040,866 A | 3/2000 | Chen et al. |
| 6,044,396 A | 3/2000 | Adams |
| 6,100,940 A | 8/2000 | Dieterich |
| 6,151,360 A | 11/2000 | Kato et al. |
| 6,181,711 B1 | 1/2001 | Zhang et al. |
| 6,192,075 B1 | 2/2001 | Jeng et al. |
| 6,201,536 B1 | 3/2001 | Hendricks et al. |
| 6,233,278 B1 | 5/2001 | Dieterich |
| 6,477,595 B1 | 11/2002 | Cohen et al. |
| 6,490,273 B1 | 12/2002 | DeNap et al. |
| 6,594,826 B1 | 7/2003 | Rao et al. |
| 2002/0019966 A1 | 2/2002 | Yagil et al. |
| 2002/0044603 A1 | 4/2002 | Rajagopalan et al. |
| 2002/0078465 A1 | 6/2002 | Stahl et al. |
| 2002/0129375 A1 | 9/2002 | Kim et al. |
| 2002/0166120 A1 | 11/2002 | Boylan et al. |
| 2003/0043915 A1* | 3/2003 | Costa et al. ............ 375/240.24 |
| 2004/0111756 A1 | 6/2004 | Stuckman et al. |

* cited by examiner

METHOD AND SYSTEM TO IMPROVE THE TRANSPORT OF COMPRESSED VIDEO DATA

CROSS-REFERENCE TO RELATED APPLICATIONS

This application is a divisional of U.S. patent application Ser. No. 09/942,260, filed Aug. 28, 2001 now U.S. Pat. No. 6,970,512, which is hereby incorporated by reference.

TECHNICAL FIELD

The present invention relates to methods and systems for improving the transport of variable bit rate data signals over a bandwidth limited communication network.

BACKGROUND OF THE INVENTION

Numerous compression schemes address the transport and reconstruction of motion images (e.g. video) for pseudo-real-time and non-real-time applications. Many of these schemes make use of buffers, especially at a receiving end of a communication network, for storing partial blocks of information which are pre-transmitted to the receiver. For pseudo-real-time applications, the buffer has a buffer length which is a function of a total amount of bits of information to be sent and a bandwidth available in the communication network. For non-real-time applications, part of the information, such as Discrete Cosine Transform (DCT) coefficients, is sent ahead of time, while the rest of the information is sent later and reconstructed in real time.

The Motion Pictures Experts Group 2 (MPEG2) compression standard makes use of motion compensation to reduce the data rate. Although the content is compressed at a certain bit rate, such as 1.5 Megabits per second (Mbps), the actual bandwidth used temporally varies. The temporal variation creates peaks and troughs in the bandwidth. For purposes of illustration and example, consider a hypothetical real-time transmission of compressed motion images which produces a bit rate versus time graph 10 shown in FIG. 1. The bit rate has an upper bound of 1.5 Mbps and is variable over time. In a DVD movie, for example, the bit rate may vary from 2.5 Mbps to 8 Mbps.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Disclosed herein are methods and systems that can improve, and optionally optimize, the video quality of bandwidth-limited transmission links. By analyzing content in advance of final coding, a constant bit rate (CBR) or a near-CBR type data stream can be constructed that encodes video at a higher bit rate than existing coding schemes. The result is a higher quality video delivery on the same band-limited link.

Figure 2:
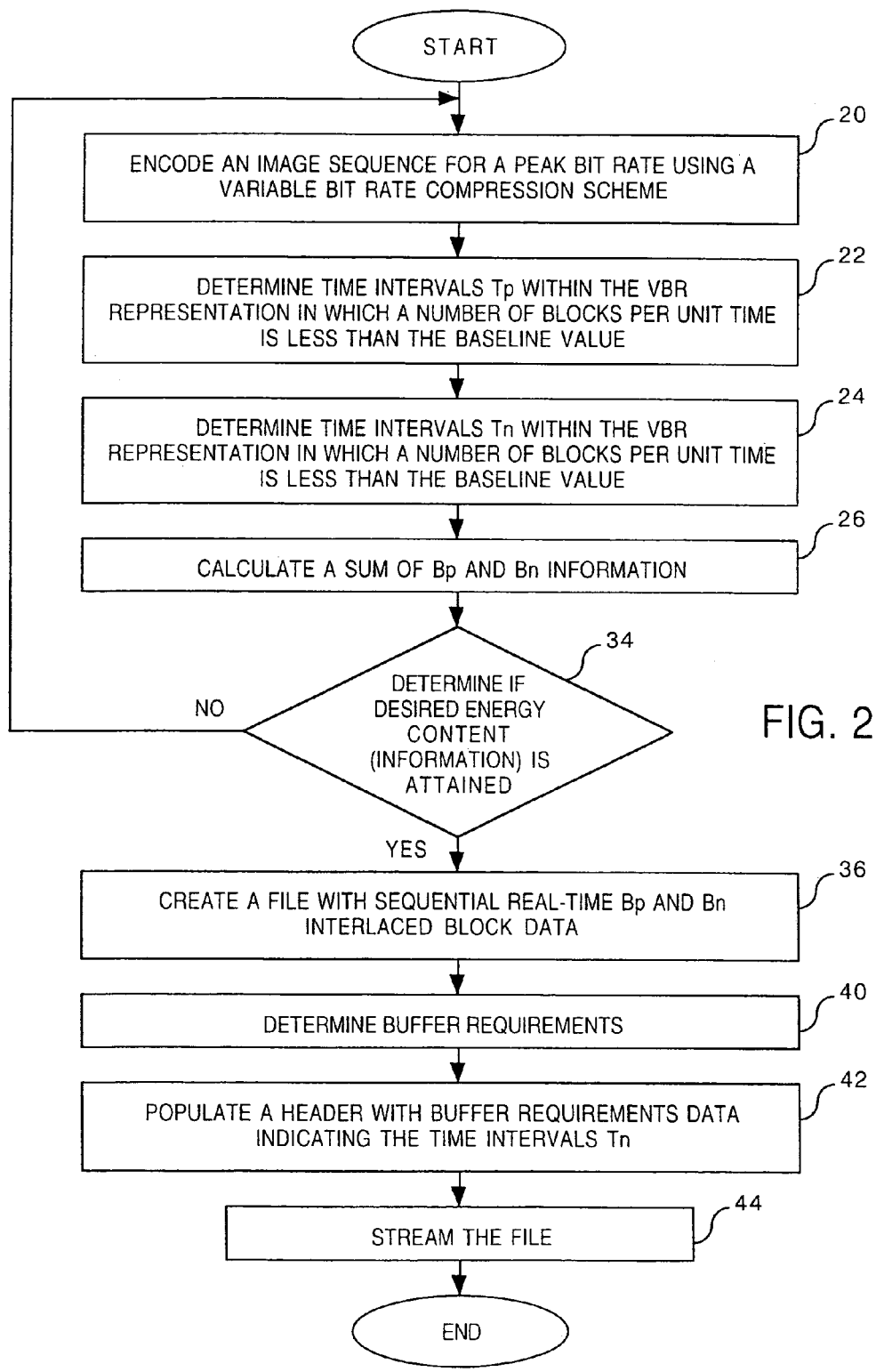
FIG. 2 is a flow chart of an embodiment of a method of improving the transport of compressed video data.

FIG. 2 is a flow chart of an embodiment of a method of improving the transport of compressed video data. As indicated by block 20, the method comprises encoding an image sequence to provide a variable bit rate (VBR) representation thereof. The encoding may be based upon a pre-selected peak bit rate which the VBR representation is not to exceed. The image sequence may be encoded in accordance with an MPEG compression standard such as MPEG2, for example. The resulting VBR representation comprises a plurality of blocks of information.

Figure 1:
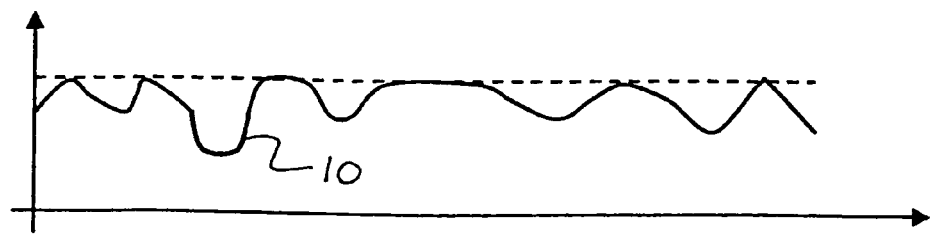
FIG. 1 is a graph of bit rate versus time for a hypothetical real-time transmission of compressed motion images.
Figure 3:
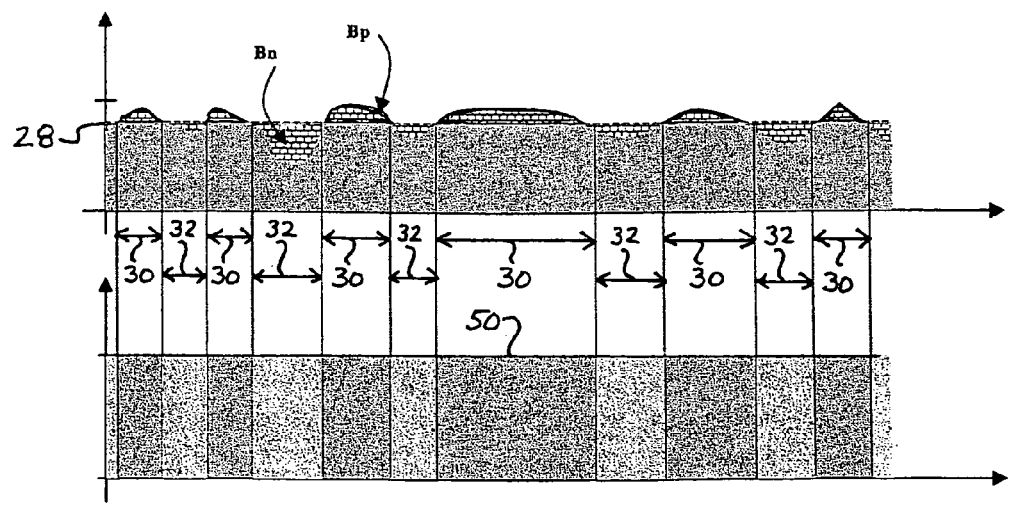
FIG. 3 illustrates the transmission curve of FIG. 1 in terms of blocks of information that are sent per unit time.

For purposes of illustration and example, consider that the resulting VBR representation has the transmission curve given in FIG. 1. FIG. 3 illustrates the transmission curve of FIG. 1 in terms of blocks of information that are sent per unit time. FIG. 3 considers the transmission curve of FIG. 1 from an energy perspective. The power over a time segment is based on an integral of the transmission curve over the time segment. Further, the instantaneous value varies based on the amplitude of the curve at a point in time. During complex scenes with significant motion, the number of blocks of information is relatively high. In contrast, during periods of little or no motion, the number of blocks of information is relatively low.

Referring back to FIG. 2, an analysis of block coding statistics is performed as indicated by blocks 22, 24 and 26. In particular, block 22 indicates an act of determining a plurality of time intervals Tp within the VBR representation in which a number of blocks of information per unit time is greater than a baseline value. Block 24 indicates an act of determining a plurality of time intervals Tn within the VBR representation in which a number of blocks of information per unit time is less than the baseline value. Referring back to FIG. 3, the baseline value is indicated by reference numeral 28, the plurality of time intervals Tp are indicated by reference numeral 30, and the plurality of time intervals Tn are indicated by reference numeral 32. The baseline value 28 may be based on an average value for the curve. The baseline value 28 represents the bit rate desired when the transmission rate has been chosen.

In the context of this application, the variable Bp represents the equivalent block data that resides above the baseline value in a Tp time interval. The variable Bn represents the equivalent block data that resides below the baseline value in a Tn time interval. Block 26 in FIG. 2 indicates an act of calculating a sum of Bp and Bn information to ensure that $\Sigma Bn \geq \Sigma Bp$. Optionally, this act may include increasing the baseline value 28 from the average value to ensure that $\Sigma Bn \geq \Sigma Bp$. As another option, the baseline value 28 may be determined such that $\Sigma Bn = \Sigma Bp$, which provides an optimal condition for the present invention.

As indicated by block 34, an act of determining if a desired maximum information content is attained. This act may comprise determining if the baseline value is less than or equal to a threshold value, such as the bandwidth limit of a communication network.

If the desired information content is not attained, flow of the method is directed back to block 20 wherein the image sequence is re-encoded for a higher peak bit rate to form another VBR representation. The acts indicated by blocks 22, 24 and 26 are repeated to analyze the block coding statistics for the new VBR representation. The acts indicated by blocks 20, 22, 24 and 26 are repeated until a desired maximum information content is attained or exceeded.

Once the desired information content is attained, an act of creating a second representation of the image sequence is performed as indicated by block 36. In the second representation, some blocks of information Bp are removed from the time intervals Tp, and time-advanced to be interlaced with blocks of information Bn in the time intervals Tn to reduce a variation in a number of blocks of information per unit time between the time intervals Tp and Tn. To create the second representation, the Tp and Tn time intervals are tagged. The time intervals may be tagged based on a frame number. It is then determined where time-advanced Bp blocks can be inserted into Tn time intervals. Preferably, the time-advanced Bp blocks are distributed into Tn time intervals so that the number of blocks of information per unit time in the second representation is about equal to the baseline value in all of the time intervals Tp and Tn. In an exemplary case, the second representation is a CBR representation in which the number of blocks of information per unit time in the second representation is equal to the baseline value in each of the time intervals Tp and Tn. A file is created which comprises sequential real-time Bp and Bn interlaced block data.

As indicated by block 40, an act of determining buffer requirements at a transmitter is performed. As indicated by block 42, an act of populating a header in the second representation with data indicating the time intervals Tn and the buffer requirements. Preferably, the header is populated with the length and number of Tn time intervals.

As indicated by block 44, an act of streaming the second representation of the image sequence via a communication network is performed. The second representation comprises the header and the file. Referring back to FIG. 3, the bit rate versus time of the resulting data stream is illustrated by the curve indicated by reference numeral 50. Note that in the Tn time intervals, real-time Bn block information along with time-advanced Bp block information is transmitted. The resulting stream in this example is a CBR stream which conforms to the link rate of 1.5 Mbps, but in essence contains coded video at a higher rate, such as 2.0 Mbps for example.

Beneficially, the acts indicated by blocks 20, 22, 24, 26 and 34 may be used to determine a bit rate for encoding the image sequence to the VBR representation which produces a desired information content of the second representation and constrains a maximum bit rate of the second representation to be less than or equal to a predetermined value. Optionally, the aforementioned acts may be used to determine a bit rate for encoding the image sequence to the VBR representation which substantially maximizes a desired information content of the second representation and constrains a maximum bit rate of the second representation to be less than or equal to a predetermined value.

Figure 4:
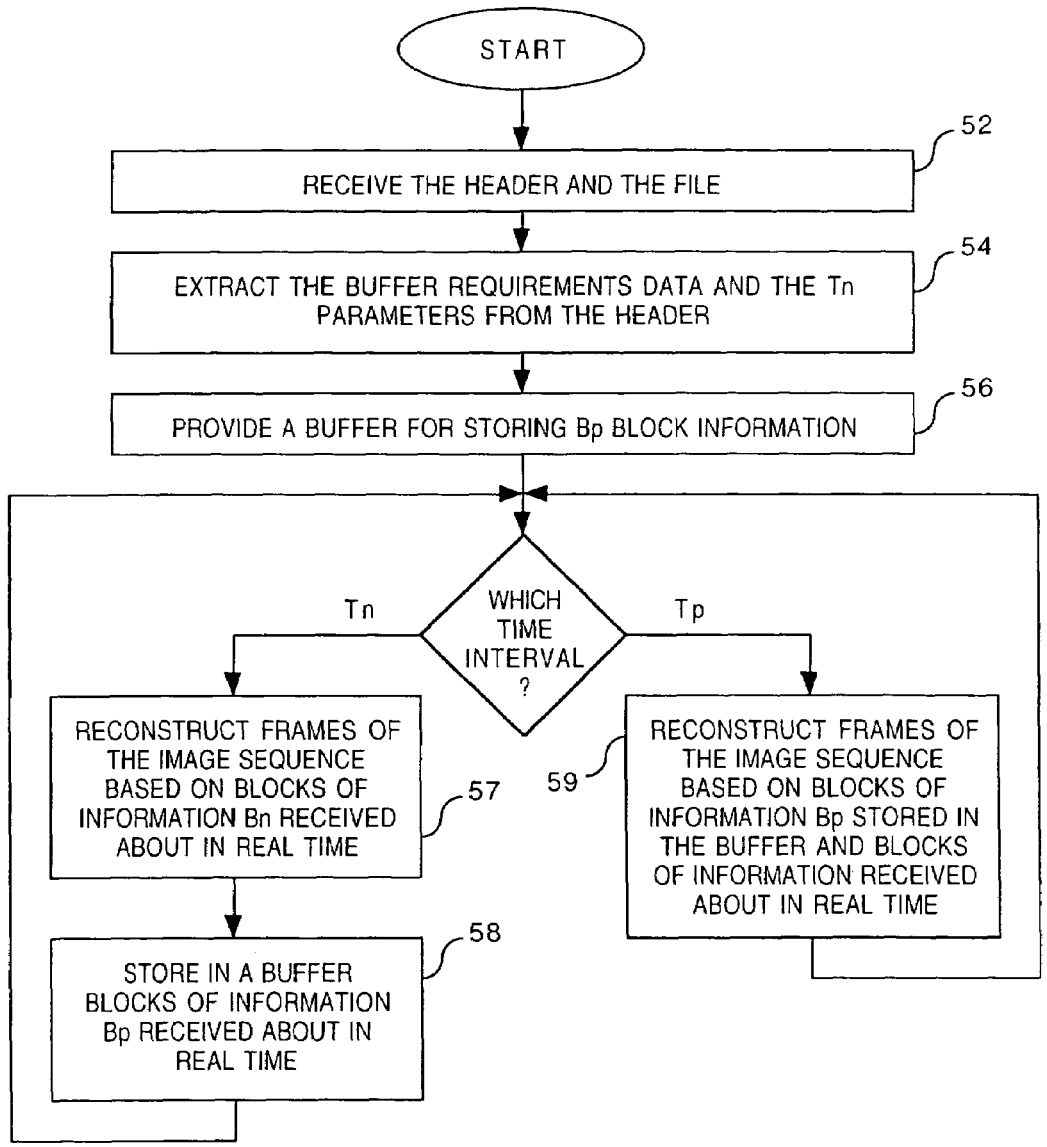
FIG. 4 is a flow chart of an embodiment of a method performed at a receiver.

FIG. 4 is a flow chart of an embodiment of a method performed at a receiver. As indicated by block 52, the method comprises receiving the second representation of the image sequence via the communication network. As indicated by block 54, the buffer requirement data and the Tn parameters are extracted from the header. Based on the buffer requirement data, a buffer is provided for storing Bp block information (block 56). Preferably, the buffer comprises a content addressable memory (CAM) type buffer.

Frames of the image sequence are reconstructed concurrently with the second representation being received. During the time intervals Tn, frames of the image sequence are reconstructed based on blocks of information Bn received about in real time (block 57). Further during the time intervals Tn, the blocks of information Bp which are received are stored in the buffer (block 58). During the time intervals Tp, frames of the image sequence are reconstructed based on the blocks of information Bp stored in the buffer and blocks of information received about in real time (block 59).

As used herein, the phrase "about in real time" contemplates any processing and/or storage delays which may result in a non-strict real time reconstruction of the frames. Thus, the frames of the image sequence are reconstructed concurrently with the reception of the second representation either strictly in real time or non-strictly in real time.

Figure 5:
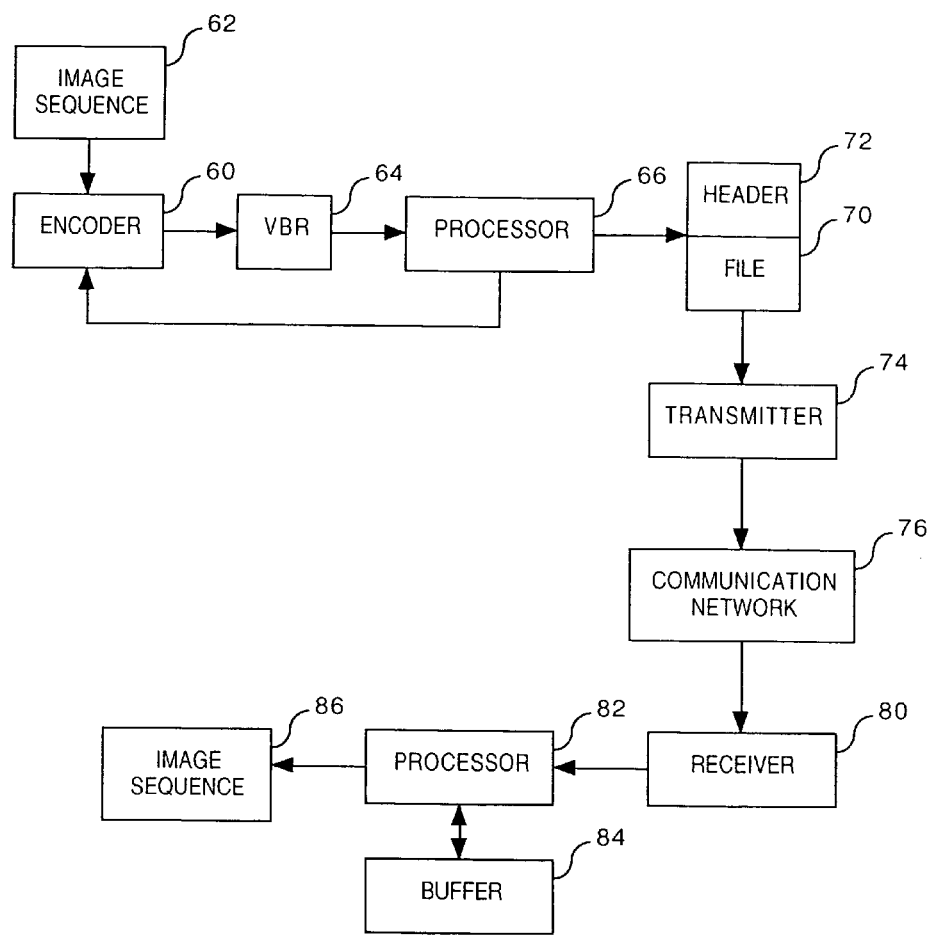
FIG. 5 is a block diagram of an embodiment of a system to perform the herein-disclosed methods.

FIG. 5 is a block diagram of an embodiment of a system to perform the herein-disclosed methods. An encoder 60 encodes an image sequence 62 to provide a VBR representation 64. A processor 66 performs the block coding statistics analysis of the VBR representation 64. The processor 66 may direct the encoder 60 to re-encode the image sequence 62 based on the aforementioned analysis until a desired information content condition is attained.

The processor 66 creates a file 70 that contains a representation of the image sequence 62 in which some blocks of information Bp are removed from the time intervals Tp and interlaced with blocks of information Bn in the time intervals Tn to reduce a variation in a number of blocks of information per unit time between the time intervals Tp and Tn. The processor 66 populates a header 72 with data indicating the time intervals Tn. The file 70 and the header 72 are stored by a computer-readable storage medium. A transmitter 74 streams the header 72 and the file 70 via a communication network 76.

The system comprises a receiver 80 to receive the header 72 and the file 70 via the communication network 76. A processor 82 is responsive to the receiver 80 to extract data indicating the time intervals Tn from the header 72. The processor 82 reconstructs frames of the image sequence concurrently with the reception of the file 70. During the time intervals Tn, the processor 82 reconstructs frames of the image sequence based on blocks of information Bn received about in real time. Further during the time intervals Tn, the processor 82 stores the blocks of information Bp in a buffer 84. During the time intervals Tp, the processor 82 reconstructs frames of the image sequence based on the blocks of information Bp stored in the buffer 84 and blocks of information received about in real time. Reconstructed frames of the image sequence are indicated by reference numeral 86.

The acts performed by the processor 66 may be directed by computer-readable program code stored by a computer-readable medium. Similarly, the acts performed by the processor 82 may be directed by computer-readable program code stored by a computer-readable medium.

Preferred embodiments of a method and system to improve the transport of compressed video data have been described herein. The embodiments disclosed herein facilitate higher bit rate content to be transmitted over the same band-limited transmission link. Making use of MPEG2 block structure and block sequence reduces the computational complexity of the scheme and is well suited to CAM-oriented silicon solutions.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of reconstructing an image sequence originally encoded in a variable bit rate (VBR) representation, the VBR representation comprising a plurality of blocks of information, the VBR representation defining a plurality of time intervals Tp in which a number of blocks of information per unit time is greater than a baseline value and a plurality of time intervals Tn in which a number of blocks of information per unit time is less than the baseline value, the method comprising:

receiving a second representation of the image sequence in which some blocks of information Bp are removed from the time intervals Tp and interlaced with blocks of information Bn in the time intervals Tn to reduce a variation in a number of blocks of information per unit time between the time intervals Tp and Tn; and reconstructing frames of the image sequence concurrently with said receiving, said reconstructing comprising:

during the time intervals Tn, reconstructing frames of the image sequence based on blocks of information Bn received about in real time, and storing the blocks of information Bp in a buffer; and during the time intervals Tp, reconstructing frames of the image sequence based on the blocks of information Bp stored in the buffer and blocks of information received about in real time.

2. The method of claim 1 wherein the number of blocks of information per unit time in the second representation is about equal to the baseline value in the time intervals Tp and Tn.

3. The method of claim 1 wherein the second representation comprises a header with data indicating the time intervals Tn, the method further comprising extracting the data indicating the time intervals Tn from the header, wherein said reconstructing the frames is based on the data indicating the time intervals Tn.

4. Computer-readable media having computer-readable program code embodied therein for reconstructing an image sequence originally encoded in a variable bit rate (VBR) representation, the VBR representation comprising a plurality of blocks of information, the VBR representation defining a plurality of time intervals Tp in which a number of blocks of information per unit time is greater than a baseline value and a plurality of time intervals Tn in which a number of blocks of information per unit time is less than the baseline value, the computer-readable program code comprising:

computer-readable program code to receive a second representation of the image sequence in which some blocks of information Bp are removed from the time intervals Tp and interlaced with blocks of information Bn in the time intervals Tn to reduce a variation in a number of blocks of information per unit time between the time intervals Tp and Tn; and computer-readable program code to reconstruct frames of the image sequence concurrently with said receiving, said reconstructing comprising:

during the time intervals Tn, reconstructing frames of the image sequence based on blocks of information Bn received about in real time, and storing the blocks of information Bp in a buffer; and during the time intervals Tp, reconstructing frames of the image sequence based on the blocks of information Bp stored in the buffer and blocks of information received about in real time.

5. The computer-readable media of claim 4 wherein the number of blocks of information per unit time in the second representation is about equal to the baseline value in the time intervals Tp and Tn.

6. The computer-readable media of claim 4 wherein the second representation comprises a header with data indicating the time intervals Tn, the computer-readable media further comprising computer-readable program code to extract the data indicating the time intervals Tn from the header, wherein said reconstructing the frames is based on the data indicating the time intervals Tn.

* * * * *